(12) United States Patent
Chickering et al.

(10) Patent No.: US 7,308,447 B2
(45) Date of Patent: Dec. 11, 2007

(54) DISTRIBUTED RESERVOIR SAMPLING FOR WEB APPLICATIONS

(75) Inventors: David M. Chickering, Bellevue, WA (US); Ashis K. Roy, Kirkland, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 11/212,301

(22) Filed: Aug. 26, 2005

(65) Prior Publication Data

US 2007/0050357 A1   Mar. 1, 2007

(51) Int. Cl.
*G06F 17/30* (2006.01)
(52) U.S. Cl. .......................................................... 707/6
(58) Field of Classification Search .................... 707/2, 707/6, 10; 718/104; 709/226
See application file for complete search history.

(56) References Cited

U.S. PATENT DOCUMENTS

| 6,374,297 B1 * | 4/2002 | Wolf et al. | ................. | 709/226 |
| 7,269,157 B2 * | 9/2007 | Klinker et al. | ............. | 370/351 |
| 2005/0149940 A1 * | 7/2005 | Calinescu et al. | .......... | 718/104 |

OTHER PUBLICATIONS

C. Jermaine, et al., "Online Maintenance Of Very Large Random Samples", in SIGMOD Conference, 2004, pp. 299-310.
V. Kachitvichyanukul, et al., "Sampling From The Hypergeometric Distribution", ACM Transactions on Mathematical Software, Dec. 1988, 14(4):397-398.
J. S. Vitter, "Random Sampling With A Reservoir. ACM Transactions on Mathematical Software", Mar. 1985, 11(1):37-57.
A. McLeod, et al., "A Convenient Algorithm For Drawing A Simple Random Sample. Applied Statistics", 1983, 32(2):182-184.
J. Pitman, "Probability", Springer-Verlag, New York, 1997.
D. E. Knuth, "The Art Of Computer Programming: vol. 2, Seminumerical Algorithms. Addison-Wesley", 1981. Third Edition.

* cited by examiner

*Primary Examiner*—Etienne Leroux
(74) *Attorney, Agent, or Firm*—Amin, Turocy & Calvin LLP (57) ABSTRACT

Random samples without replacement are extracted from a distributed set of items by leveraging techniques for aggregating sampled subsets of the distributed set. This provides a uniform random sample without replacement representative of the distributed set, allowing statistical information to be gleaned from extremely large sets of distributed information. Subset random samples without replacement are extracted from independent subsets of the distributed set of items. The subset random samples are then aggregated to provide a uniform random sample without replacement of a fixed size that is representative of a distributed set of items of unknown size. In one instance, a multivariate hyper-geometric distribution is sampled by breaking up the multivariate hyper-geometric distribution into a set of univariate hyper-geometric distributions. Individual items of a uniform random sample without replacement are then determined utilizing a normal approximation of the univariate hyper-geometric distributions and a finite population correction factor.

20 Claims, 9 Drawing Sheets

DISTRIBUTED RESERVOIR SAMPLING FOR WEB APPLICATIONS

BACKGROUND

In situations where one has access to massive amounts of data, the cost of building a statistical model to characterize the data can be significant if not insurmountable. The accuracy of the model and the cost of building the model are competing interests associated with building a statistical model. That is, while the use of a larger data set may provide a more accurate model than a smaller set of the data, the analysis of data tends to become increasingly inefficient and expensive with larger data sets. Because of the computational complexity associated with analyzing large data sets, a common practice is to build a model on the basis of a sample of the data. This allows, for example, predictions to be formulated using the model as a guide.

With the spreading of the Internet comes a substantially increased flow of information. The Internet allows easy dissemination of all types of information with minimal barriers to entry (typically one must just have access to a computer to create and/or send data). Thus, the number of large information databases has drastically increased as the Internet has grown. It is also frequently difficult to ascertain the size of a particular database. One only has to enter the search term "dog" on a search engine and look at the total number of returned entries to appreciate the vastness of the stored knowledge provided almost instantaneously by the Internet. That single search can return millions of "hits" that can include additional megabytes of information to be found at each of the links provided by the search, truly overwhelming.

However, despite the enormity of the information, there are actual systems of hardware and software that must read, interpret, store, and receive/transmit this information in order for it to be available for a user to find. These systems must be built and scaled to operate efficiently to handle data volumes of this size. It is often necessary to utilize, for example, multiple computers to handle a single task due to its size. For example, an Internet web site can have multiple servers provide access to the web site in order to provide enough bandwidth so that users are not waiting for extended periods of time to download web pages.

While providing increased resources facilitates in compensating for tremendous data throughput, it, at the same time, also greatly increases the complexity of determining the necessary resources to meet those demands. That is, for example, if users complain about slow response times for a web site, a second server can be incorporated to speed up the web site response time. It seems simple until the example expands to include a popular web site supported by 100 servers with billions of hits per month. The amount of statistical data for the web site throughput is now too large to peruse in its entirety each month, and it is also distributed across 100 different servers. Trying to determine statistics such as peak loading, average loading, types of users, duration of use, and/or access path and the like becomes an unfathomable task. However, without this information, it would be impossible to determine if 10 more servers would be sufficient to ease traffic concerns or if 50 more servers are required. Thus, obtaining this type of data is extremely valuable for web sites and other situations where extreme amounts of data need to be processed in a quick and efficient manner to glean important information that would otherwise be unobtainable with current technologies.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to data mining, and more particularly to systems and methods for extracting a random sample without replacement from a distributed set of items. Techniques for aggregating sampled subsets of the distributed set are leveraged to provide a uniform random sample without replacement representative of the distributed set. This allows statistical information to be gleaned from extremely large sets of distributed information such as, for example, web site traffic statistics and the like when the web site is supported by multiple servers. Subset random samples without replacement are extracted from independent subsets of a distributed set of items. The subset random samples are then aggregated to provide a uniform random sample without replacement of a fixed size that is representative of the distributed set of items. Data mining can be performed in this manner despite the distributed data set being of unknown size.

In one instance, a multivariate hyper-geometric distribution is processed by breaking up the multivariate hyper-geometric distribution into a set of univariate hyper-geometric distributions. Individual items of a uniform random sample without replacement are determined utilizing a normal approximation of the univariate hyper-geometric distributions and a finite population correction factor. This substantially enhances the speed of the distributed set sampling process. In this manner, extremely large sets of data can be efficiently sampled without obtaining knowledge of all items of a data set. This is extremely beneficial when statistical data is required.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Systems and methods are provided to extract a random sample without replacement in a distributed manner; that is, to sample items from a set, where each item can appear at most once in the sample, using, for example, a number of independent sampling processors. These techniques can be employed, for example, to extract a random sample of visitors to a web site. When the web site has many visitors, it is common to have multiple servers handling the traffic. The technologies provided herein, for example, allow each server to accumulate a random sample and then for a centralized server to aggregate those samples into a single sample. Thus, a process accumulates a random sample without replacement by aggregating a number of random samples without replacement. Reservoir sampling can be utilized for the individual samples that are then aggregated. This is especially useful in sampling web traffic. Multiple processing units can also be utilized to obtain a random sample by accumulating individual samples into one or more aggregate samples. The processing units can be, for example, web servers that, for example, collect web-traffic information for a web site. However, the processing units can also be, for example, robot sensors and/or car sensors and the like. Thus, the systems and methods herein are not limited to only web applications.

Figure 1:
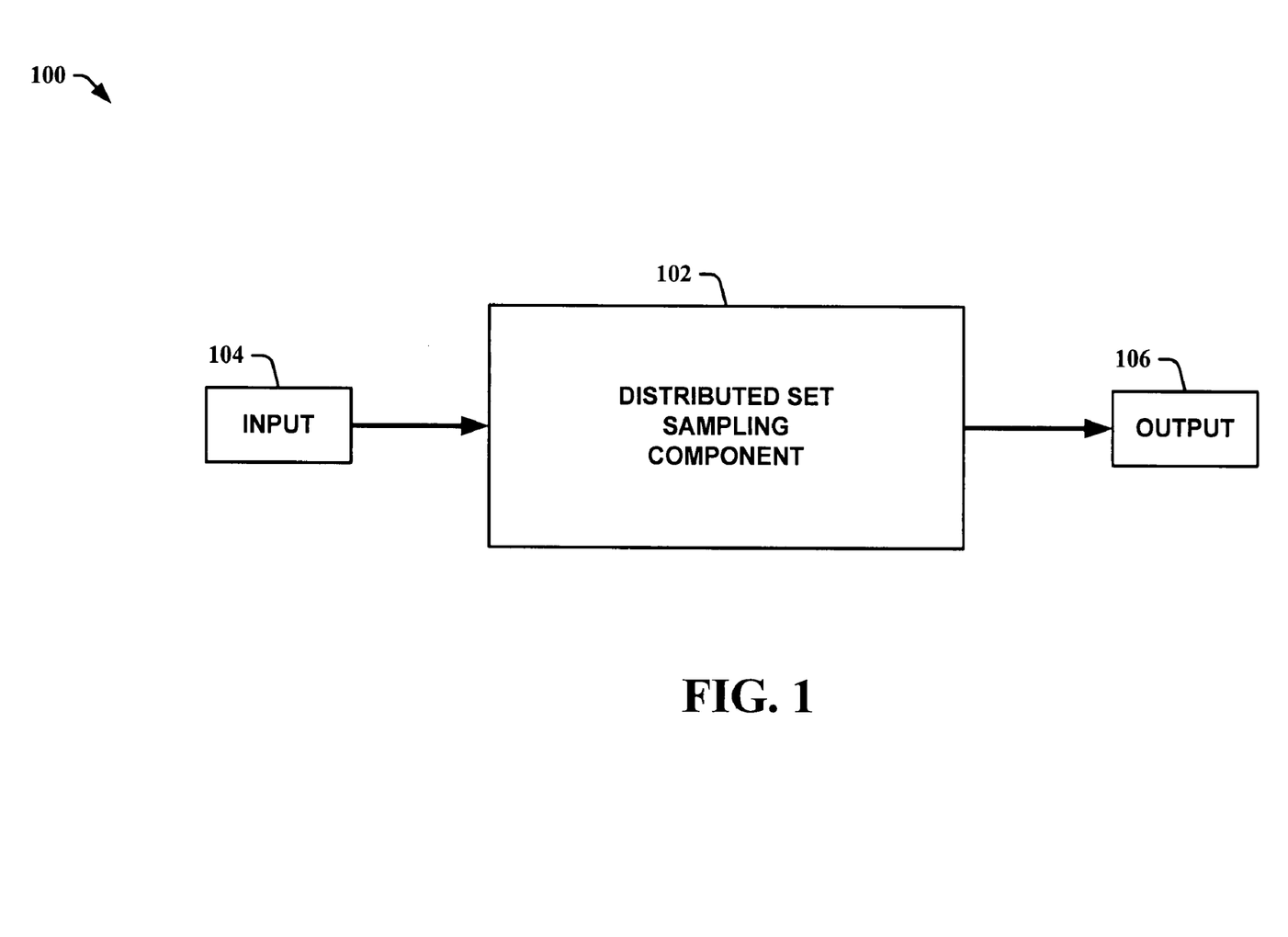
FIG. 1 is a block diagram of a distributed set sampling system in accordance with an aspect of an embodiment.

In FIG. 1, a block diagram of a distributed set sampling system 100 in accordance with an aspect of an embodiment is shown. The distributed set sampling system 100 is comprised of a distributed set sampling component 102 that receives an input 104 and provides an output 106. The input 104 is comprised of random sample without replacement sets that are obtained from independent subsets of a distributed set of items of unknown size. The random sample sets can be obtained utilizing reservoir sampling and the like. The distributed set can include, but is not limited to, data items such as web traffic data, television view preference data, radio audience usage data, automotive diagnostic data, and/or factory manufacturing sensor data (e.g., robotic sensors, product tracking data, machine alignment data, etc.— typically, factories have redundant manufacturing lines such that the data is distributed throughout the factory and/or factories, including remote locations such as factories in other cities and/or countries and the like) and the like.

Distributed data is commonly found in systems that handle large amounts of information. This is, in part, due to the economic factors associated with providing cost-effective scaling capabilities. It is generally cheaper to add additional devices as needed than to redesign a single device to handle more data each time growth occurs. This causes the data to be spread out or 'distributed' across multiple devices that receive the data. As the received data size grows increasingly large, statistical data is usually obtained by sampling the received data rather than spending large amounts of time and resources to look at every piece of data. Thus, random sampling techniques are utilized to provide a representative sample of the data. Sampling without replacement ensures that each sample is unique in a sample set. Otherwise, there is a probability that the same data item could be sampled twice.

Each receiving entity obtains data from an independent subset of the distributed set. This allows the sampling of each subset to produce non-redundant sample items that are representative of each of the subsets of the distributed set. Although it is typical that the independent subsets are received by separate entities, it is not required. Thus, a single entity can obtain multiple subsets and provide independent samples for those subsets. For example, a multi-channel radio receiver can receive multiple channels of data, independently sample each data channel, and provide multiple random samples as input 104.

The distributed set sampling component 102 receives the input 104 and aggregates the input 104 to provide the output 106. The aggregation technique utilized can include, but is not limited to, distributed reservoir sampling (see, infra) and the like. The distributed set sampling component 102 'samples' the random samples obtained from the input 104 to construct a uniform random without replacement sample that is representative of the distributed set of items. The uniform random sample without replacement is then provided as output 106. This type of sample is commonly utilized in statistical models and the like to formulate, for example, cost projections, expected viewer numbers for television shows, predicted web-traffic for an Internet web site, future production capabilities for a company, and/or part failure rates for an automotive device and the like. Thus, the output 106 provides substantial benefits that were previously difficult or even impossible to obtain for distributed sets of items (especially for extremely large data sets).

Figure 2:
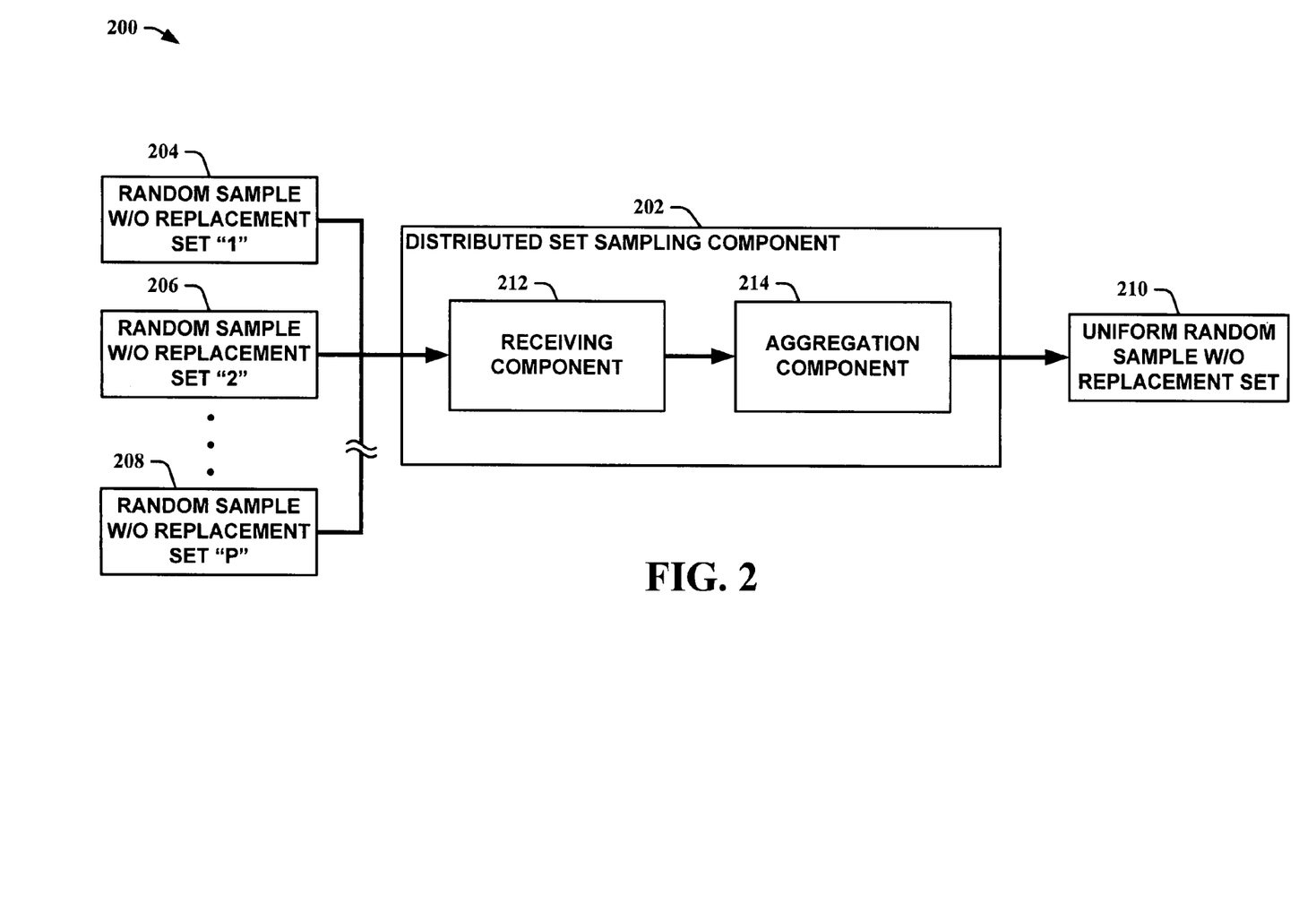
FIG. 2 is another block diagram of a distributed set sampling system in accordance with an aspect of an embodiment.

Looking at FIG. 2, another block diagram of a distributed set sampling system 200 in accordance with an aspect of an embodiment is depicted. The distributed set sampling system 200 is comprised of a distributed set sampling component 202 that receives random sample without replacement sets "1-P" 204-208, where "P" represents an integer from one to infinity, as inputs and provides a uniform random sample without replacement set 210 as an output. The distributed set sampling component 202 is comprised of a receiving component 212 and an aggregation component 214. The receiving component 212 receives random sample without replacement sets "1-P" 204-208. It 212 can receive the random sample without replacement sets "1-P" 204-208 from a single entity or multiple entities. This includes, for example, receiving random sample without replacement set "1" 204 and random sample without replacement set "2" 206 from a single entity while receiving random sample without replacement set "P" 208 from another entity and the like (i.e., including other combination possibilities). The aggregation component 214 obtains the random sample without replacement sets "1-P" 204-208 from the receiving component 212 and aggregates the sets 204-208 to provide the uniform random sample without replacement set 210. The aggregation technique can include, but is not limited to, distributed reservoir sampling and the like as described infra. The uniform random sample without replacement set 210 is a representative sample of a distributed data set of items from which the random sample without replacement sets "1-P" 204-208 were obtained. Thus, it 210 can be utilized to formulate statistical data and the like for even extremely large distributed data sets.

Figure 3:
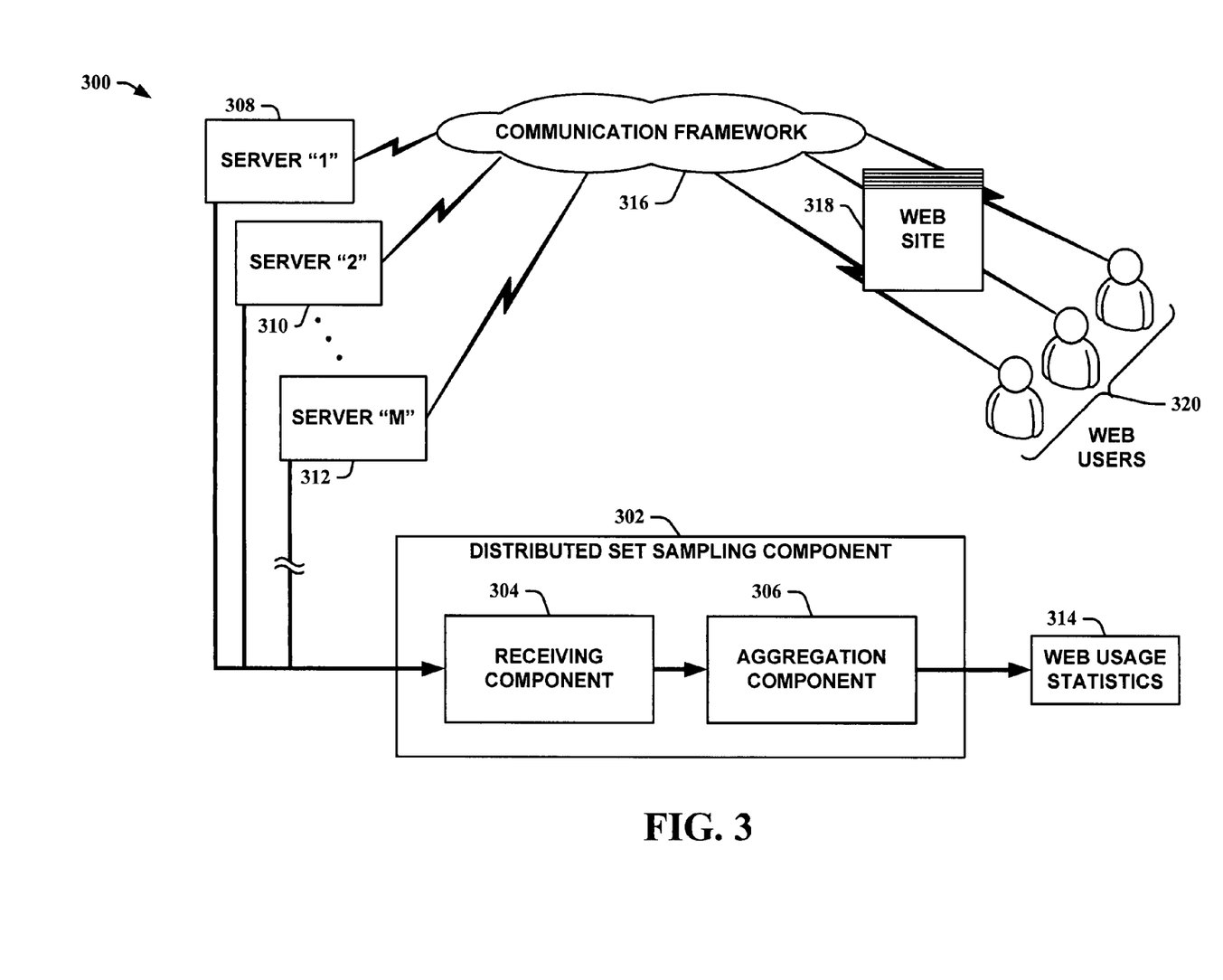
FIG. 3 is yet another block diagram of a distributed set sampling system in accordance with an aspect of an embodiment.

Turning to FIG. 3, yet another block diagram of a distributed set sampling system 300 in accordance with an aspect of an embodiment is illustrated. The distributed set sampling system 300 is comprised of a distributed set sampling component 302. The distributed set sampling component 302 is comprised of a receiving component 304 and an aggregation component 306. The distributed set sampling component 302 obtains random samples without replacement from Internet web servers "1-M" 308-312, where "M" represents an integer from one to infinity, and provides web usage statistics 314. In this example, the servers "1-M" 308-312 provide support via a communication framework 316 (e.g., the Internet, an intranet, etc.) for a web site 318. The web site 318 is accessed by web users 320 who desire to visit the web site 318. The web users 320 can be located anywhere in the world and, thus, the servers "1-M" 308-312, for example, can represent mirror web sites that allow expedient access to the web site 318 for web users 320 located in different countries. The servers "1-M" 308-312 can also represent, for example, "subsite" support for the web site 318. That is, an extremely large web site can have large amounts of information on different web pages requiring that a web page and/or groups of web pages of the web site 318 be supported by individual servers to maintain performance of the web site 318. For example, the web site 318 can have a 'product specifications' link that contains a web page with millions of data points for thousands of products. Thus, this particular web page of the web site 318 can be supported by one or more servers to ensure efficient data retrieval speeds.

The servers "1-M" 308-312 generally maintain statistical data such as, for example, number of accesses, user information, originations of accesses (where it was linked from), times of accesses, and/or lengths of accesses and the like. For a popular web site, this statistical data can contain millions or even trillions or larger bits of information. To process each piece of data would require immense amounts of time and resources. Thus, the servers "1-M" 308-312 employ random sampling techniques such as, for example, reservoir sampling and the like to obtain a random sample without replacement set that is representative of the data that they have acquired. This data is actually a subset of the data for the web site 318. Thus, the data for the web site 318 is a 'distributed data set' that is distributed across the servers "1-M" 308-312. The servers "1-M" 308-312 each have independent subsets of the distributed data set from which they sample to formulate their random sample without replacement set. In order to get a total statistical picture for the web site 318, the random sample without replacement sets from the servers "1-M" 308-312 are gathered by the receiving component 304 and relayed to the aggregation component 306. The aggregation component 306 employs aggregation techniques such as, for example, distributed reservoir sampling and the like and formulates a uniform random sample without replacement set representative of the distributed data set for the web site 318. The random sample without replacement set is provided by the aggregation component 306 as the web usage statistics 314 for the web site 318. In this manner, large and/or complex web site support systems can still be utilized to obtain statistical web site data despite immense amounts of logged data.

As another example, a distributed reservoir-sampling algorithm can be provided that extracts a uniform random sample of fixed size from a set of records of unknown size, where each record is processed by one of a set of servers. The technology provided herein is particularly useful for mining web data because web impressions are naturally distributed across servers. The widespread use of the Internet has resulted in a number of new web-related applications for sampling. For example, a web site may draw a random sample of visitors in order to conduct a survey or, if there are attributes associated with each visitor, the web site can draw a random sample in order to build a statistical model over those attributes (e.g., demographics—such as location, gender, and/or age, etc. of web site visitors). In another application, a researcher may want to draw a random set of web pages out of the entire set of web pages reachable via hyperlinks from some page. For many of these web applications the total size of the population is not known a priori. This makes these sampling applications particularly well-suited for reservoir sampling.

A reservoir sampling algorithm draws a uniform sample without replacement of size n from a population consisting of N members, where N is unknown before the algorithm completes. The traditional motivation for using a reservoir-sampling algorithm is to sample items stored on a computer tape by performing a single pass over that tape. Contrary to the technique disclosed herein, in order to apply other standard sampling-without-replacement algorithms, an initial scan of the tape is required to count the number of items. In many web scenarios, the count may truly be unknown.

There are many reservoir-sampling algorithms of varying complexity. An easy-to-describe reservoir-sampling algorithm is "Algorithm R" from Knuth (see, D. E. Knuth, *The Art of Computer Programming: Vol. 2, Seminumerical Algorithms*, Addison-Wesley, 1981, Second Edition), who attributes the algorithm to Alan Waterman without citation. The algorithm fills a buffer of size n as follows:
1. Place the first n records in the buffer
2. Choose the kth item with probability n/k
3. If the kth item is chosen, replace a random buffer element (chosen uniformly) with the kth item There are many optimizations that can be made to this simple algorithm that reduce the running time by skipping records quickly; Vitter (see, J. S. Vitter, Random sampling with a reservoir, *ACM Transactions on Mathematical Soft-* ware, 11(1):37-57, March 1985) provides a few such optimizations. In more recent work, Jermaine, et al. (see, C. Jermaine, A. Pol, and S. Arumugam, Online maintenance of very large random samples, In *SIGMOD Conference*, pages 299-310, 2004) consider efficient implementations of reservoir sampling when the sample cannot fit in main memory.

The systems and methods herein provide a generalization of reservoir sampling that allows the sample to be drawn in a distributed fashion. This generalization is particularly convenient for web applications where individual data points are naturally handled by separate processors. For example, a large web site will likely have multiple servers providing impressions to visitors, and the distributed reservoir sampling algorithm provided herein allows drawing of a random sample of all visitors with minimal communication between the servers.

The generalization to reservoir sampling can be summarized as follows. It is assumed that the set of data from which the sample is drawn is partitioned into s non-overlapping sets of items, and that s processors independently obtain uniform samples without replacement of size n from each partition. These s samples are then combined into a single sample of size n such that the final sample is a uniform sample without replacement over the entire set of items seen by all processors. The techniques disclosed herein can also handle cases where any number of processors sees less than n samples and/or when the total number of samples seen across all processors is less than n.

Algorithm R

In order to facilitate the follow-on discussion relating to the disclosed technologies herein, it is first demonstrated that Algorithm R results in a uniform sample without replacement. This result appears in McLeod and Bellhouse (see, A. McLeod and D. Bellhouse, A convenient algorithm for drawing a simple random sample, *Applied Statistics*, 32(2):182-184, 1983). It is included here for completeness and to introduce notation that will prove useful infra.

The following notation is assumed. $B_k = \{B_k[1], \ldots, B_k[n]\}$ is utilized to denote the random vector corresponding to the buffer contents after scanning k records; $b_k = \{b_k[1], \ldots, b_k[n]\}$ is utilized to denote a particular value of $B_k$. d[i] is utilized to denote the ith record encountered during the sequential scan. For example, d[1] is the first record in a database.

Lemma 1: After scanning $k \geq n$ records, $$p(B_k = b_k) = \binom{k}{n}^{-1}; \quad \text{(Eq. 1)}$$

for all $b_k$ realizable by Algorithm R.

Proof: Induction on k. For k=n, it follows from Step 1 of the algorithm that there is only one possible value $b_k$ equal to $\{d[1], \ldots, d[n]\}$, and the lemma correctly establishes that the probability of this value is $$1 = \binom{n}{n}^{-1}.$$

Assume the lemma is correct for $k \leq m$. $p(B_{m+1} = b_{m+1})$ is now derived for all values $b_{m+1}$. This is broken into two cases:

Case 1: d[m+1] is not in $b_{m+1}$.

For this case, $p(B_{m+1} = b_{m+1})$ is the product of (1) the probability that d[m+1] was not chosen to be added to the buffer by the algorithm and (2) the probability that $B_m = b_{m+1}$; these probabilities are obtained from the induction hypothesis and Step 2 of the algorithm, respectively:

$$p(B_{m+1} = b_{m+1}) = \binom{m}{n}^{-1}\left(1 - \frac{n}{m+1}\right) = \binom{m+1}{n}^{-1}. \quad \text{(Eq. 2)}$$

Case 2: d[m+1] is in $b_{m+1}$.

For this case, the possible buffer values $b_m$ from the previous step are considered. Let q denote the position of d[n+1] in $b_{m+1}$. In order to realize the buffer $b_{m+1}$, the previous buffer $b_m$ must be identical to $b_{m+1}$ in all positions except for position q; let $B_m^q(b_{m+1})$ denote the set of previous buffers that have this property. Given the n known values in $b_{m+1}$, there are m+1−n remaining elements that could have been in position q and then gotten replaced by d[m+1], and, thus, $|B_m^q(b_{m+1})|$=m+1−n. Furthermore, from the induction hypothesis each of these buffers is equally probable, and, therefore, it is concluded that:

$$p(b_m \in B_m^q(b_{m+1})) = (m+1-n)\binom{m}{n}^{-1}. \quad \text{(Eq. 3)}$$

Now, given that $b_m \in B_m^q(b_{m+1})$, the probability that the algorithm realizes $b_{m+1}$ is the probability that d[m+1] is chosen by the algorithm, which from Step 2 of the algorithm is n/(m+1), times the probability that element q is replaced, which from Step 3 of the algorithm is 1/n. Combining these results yields:

$$p(B_{m+1} = b_{m+1}) = (m+1-n)\binom{m}{n}^{-1}\frac{n}{(m+1)n} = \binom{m+1}{n}^{-1}. \quad \text{(Eq. 4)}$$

Q.E.D.

Distributed Reservoir Sampling

The goal of distributed reservoir sampling is to obtain a uniform sample of size n from a stream (or database) of records where each record is processed by exactly one of s processors, and the number of records processed by any individual processors is not known a priori. Each processor obtains a sample of records and the algorithm provided herein combines these s samples together to produce a single sample of size n, where this final sample is a uniform without replacement sample from the set of all records encountered by all processors.

In order to handle situations in which a processor encounters fewer than n records (and thus cannot have a sample of size n), the following additional notation is needed. Assume that processor i has encountered $N_i$ records, of which $n_i$=min$(n,N_i)$ are stored with processor i. Let $n^*$=min$(n,\Sigma_i N_i)$ be the size of the final sample. The following algorithm combines the samples from each processor into the final sample:

Algorithm 'CombineSamples'

Randomly choose the number of records $\{k_1, \ldots, k_s\}$ from each processor—where $k_i \leq n_i$ and $\Sigma_i k_i = n^*$—by sampling from a multivariate hyper-geometric distribution:

$$p(k_1, \ldots, k_s) = \frac{\prod_{i=1}^{s} \binom{N_i}{k_i}}{\binom{\sum_{i=1}^{s} N_i}{n^*}}. \quad \text{(Eq. 5)}$$

For each processor i, select $k_i$ records by sampling uniformly without replacement from that processor's sample buffer.

Combination Algorithm Proof:

Lemma 2: After applying Algorithm CombineSamples, $$p(B = b) = \binom{\sum_{i=1}^{s} N_i}{n^*}^{-1} \quad \text{(Eq. 6)}$$

for all b realizable by the algorithm.

Proof: Because each record in the sample can come from only one processor, the event B=b is partitioned into the set of events $\{B^1=b^1, \ldots, B^s=b^s\}$ corresponding to the individual contributions to the final sample that came from each of the s processors. The probability of this set of events can be decomposed into three parts: (1) for each processor i, the sample in the reservoir must contain all the values $b^i$, (2) the combination algorithm must choose the number of samples such that $k_i=|B^i|$ for all i, and (3) the combination algorithm must sample exactly those values $b^i$ from the reservoir in each processor i.

Because for each processor i there are $$\binom{N_i - k_i}{n_i - k_i}$$

distinct reservoirs that can contain all of the elements $b^i$, and because each such reservoir is equally likely to occur, it is concluded that probability (1) is equal to:

$$\prod_{i=1}^{s} \frac{\binom{N_i - k_i}{n_i - k_i}}{\binom{N_i}{k_i}}. \quad \text{(Eq. 7)}$$

Probability (2) is simply the value of the multivariate hyper-geometric distribution for the given $k_i$ values. Because the combination algorithm selects records from each reservoir by sampling uniformly without replacement, probability (3) is equal to $$\prod_{i=1}^{s} \binom{k_i}{n_i}^{-1}. \quad \text{(Eq. 8)}$$

Combining these results gives:

$$p(B = b) = \prod_{i=1}^{s} \frac{\binom{N_i - k_i}{n_i - k_i}}{\binom{N_i}{n_i}} \frac{\prod_{i=1}^{s} \binom{N_i}{k_i}}{\binom{\sum_{i=1}^{s} N_i}{n^*}} \prod_{i=1}^{s} \frac{1}{\binom{n_i}{k_i}} \quad \text{(Eq. 9)}$$

$$= \binom{\sum_{i=1}^{s} N_i}{n^*}^{-1} \prod_{i=1}^{s} \frac{\binom{N_i - k_i}{n_i - k_i}\binom{N_i}{k_i}}{\binom{N_i}{n_i}\binom{n_i}{k_i}}$$

$$= \binom{\sum_{i=1}^{s} N_i}{n^*}^{-1}.$$

Q.E.D.

Figure 4:
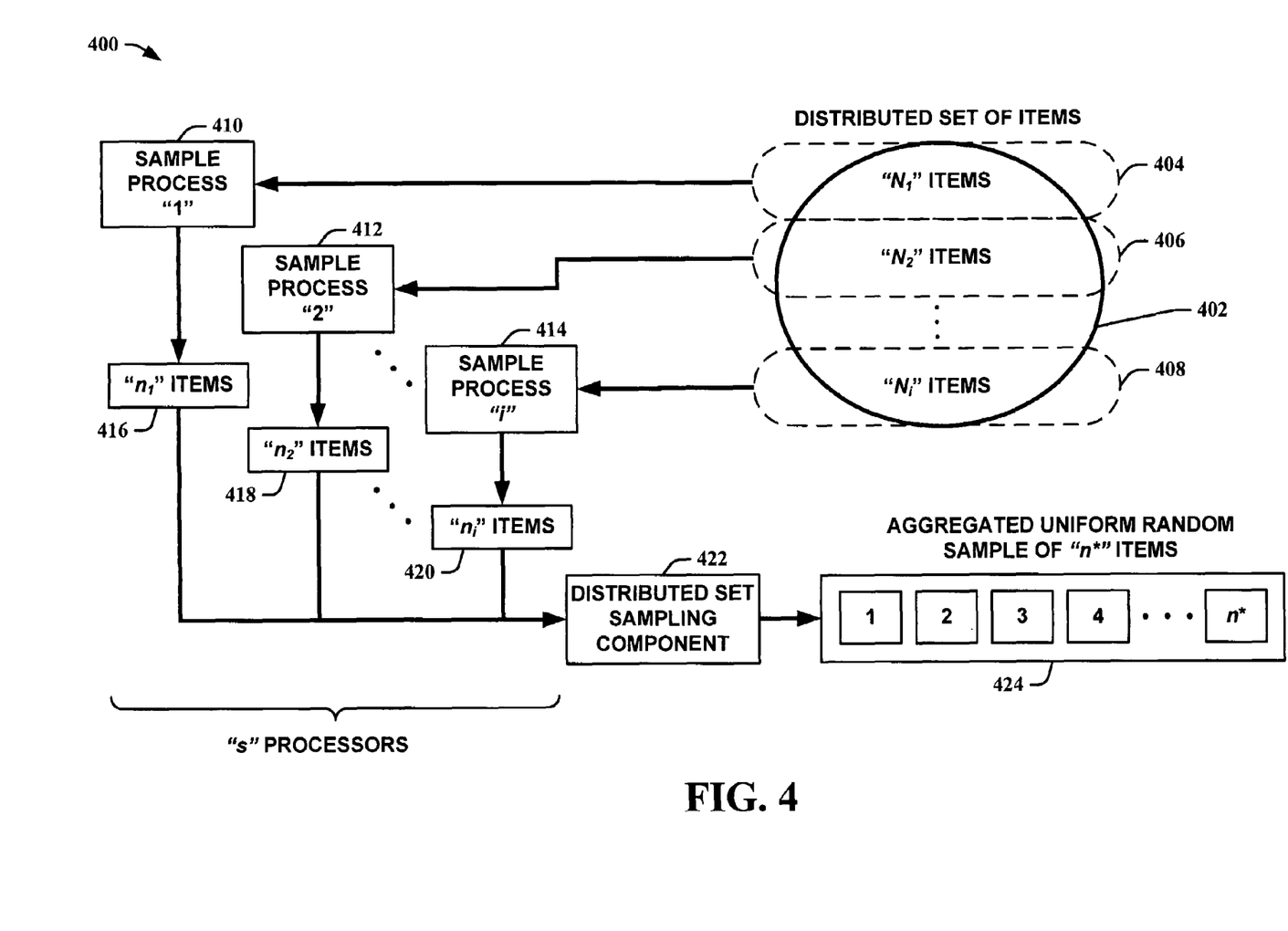
FIG. 4 is an illustration of a distributed set sampling process in accordance with an aspect of an embodiment.

In FIG. 4, an illustration of a distributed set sampling process 400 in accordance with an aspect of an embodiment is shown. A distributed set of items 402 is divided into subsets "$N_1$-$N_i$," 404-408 that contain "N" records. These subsets "$N_1$-$N_i$," 404-408 are processed by sample processes "1-i" 410-414, respectively, where i represents an integer from one to infinity. The sample processes "1-i" 410-414 can be performed on s number of processors (i.e., entities), where s represents an integer from one to infinity. The sample processes "1-i" 410-414 produce sample set items "$n_1$-$n_i$," 416-420, respectively. The distributed set sampling component 422 receives the sample set items "$n_1$-$n_i$" 416-420 and aggregates them utilizing the supra algorithm to construct an aggregated uniform random sample of "n*" items 424.

Sampling from a Multivariate Hyper-Geometric Distribution

There are many algorithms available that sample from a hyper-geometric distribution (see, for example, V. Kachitvichyanukul and B. W. Schmeiser, Sampling from the hypergeometric distribution, *ACM Transactions on Mathematical Software*, 14(4):397-398, December 1988). It is easy to use reservoir sampling to obtain a sample from a multivariate hyper-geometric distribution. For example, if n* samples are desired from two servers that have respectively sampled $N_1$ records and $N_2$ records, reservoir sampling can first be utilized to sample n* integers from the set $[1, \ldots, N_1+N_2]$. The number of samples to take from the first server is the number of sampled integers less than $N_1$. If $N_1$ and $N_2$ are substantially large (e.g., $10^{50}$) and n* is relatively small (e.g., 10), the efficiency of selecting n* decreases significantly.

The systems and methods herein can also provide a fast method for sampling from a multivariate hyper-geometric distribution that uses a normal approximation. Sampling approximately from a hyper-geometric distribution allows implementation of the algorithm provided herein to operate efficiently for large-scale web applications and the like. To accomplish this, the distribution is broken up into a set of univariate hyper-geometric distributions, and a normal approximation is utilized to draw each individual component. In particular, suppose it is desirable to sample $\{k_1, \ldots, k_s\}$ from (Eq. 5) repeated here:

$$p(k_1, \ldots, k_s) = \frac{\prod_{i=1}^{s}\binom{N_i}{k_i}}{\binom{\sum_{i=1}^{s} N_i}{n^*}}. \quad \text{(Eq. 5)}$$

To determine $k_1$, $$\text{set } N = \sum_{i=1}^{s} N_i$$

and draw from the distribution:

$$p(k_1) = \frac{\binom{N_1}{k_1}\binom{N-N_1}{n^*-k_1}}{\binom{N}{n^*}}. \quad \text{(Eq. 10)}$$

Next, given $k_1$, draw from the following distribution to determine $k_2$:

$$p(k_2|k_1) = \frac{\binom{N_2}{k_2}\binom{N-N_1-N_2}{n^*-k_1-k_2}}{\binom{N-N_1}{n^*-k_1}}; \quad \text{(Eq. 11)}$$

where $k_2$ is restricted to the values $[0, n^*-k_1]$ Continue by sampling all $k_i$ values in sequence:

$$p(k_i|k_1, \ldots, k_{i-1}) = \frac{\binom{N_i}{k_i}\binom{N-N_i-\sum_{j=1}^{i-1}N_j}{n^*-k_i-\sum_{j=1}^{i-1}k_j}}{\binom{N-\sum_{j=1}^{i-1}N_j}{n^*-\sum_{j=1}^{i-1}k_j}}; \quad \text{(Eq. 12)}$$

where $k_i$ is restricted to the values $$\left[0, n^* - \sum_{j=1}^{i-1} k_j\right].$$

It can be shown that the product of all the univariate distributions is equal to the multivariate hyper-geometric distribution. Note that the last count $k_s$ is determined with certainty because of the constraint $k_1 + \ldots + k_s = n^*$.

Samples from $p(k_i|k_1, \ldots, k_{i-1})$ are drawn using a normal approximation with the finite population correction factor (see, e.g., J. Pitman, *Probability*, Springer-Verlag, New York, 1993). In particular, let:

$$n^i = n^* - \sum_{j=1}^{i-1} k_j; \quad \text{(Eq. 13)}$$

and;

$$N^i = N - \sum_{j=1}^{i-1} N_j. \quad \text{(Eq. 14)}$$

Then $p(k_i|k_1, \ldots, k_{i-1})$ is approximately Gaussian with mean:

$$\mu = n' \frac{N_i}{N^i + N_i}; \quad \text{(Eq. 15)}$$

and standard deviation:

$$\sigma = \sqrt{\mu \frac{N^i}{N^i + N_i}} \cdot \sqrt{\frac{N^i + N_i - k_1}{N^i + N_i - 1}} \quad \text{(Eq. 16)}$$

Thus, a simple distributed algorithm has been illustrated for constructing a uniform sample of fixed size from a set of records of unknown size. The algorithm provided herein is particularly useful for data-mining algorithms applied to web data, where the collection of sample impressions is naturally distributed.

Figure 5:
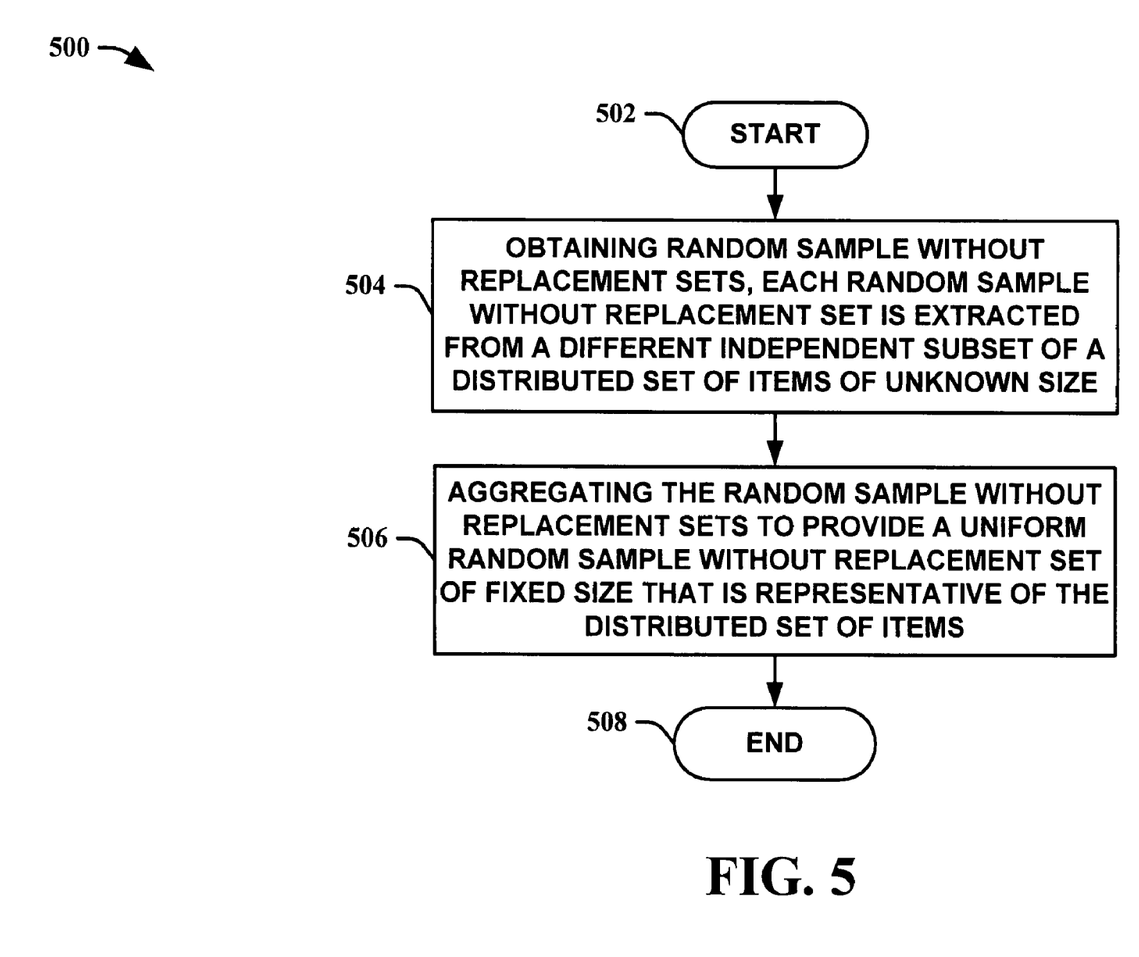
FIG. 5 is a flow diagram of a method of facilitating distributed set sampling in accordance with an aspect of an embodiment.
Figure 6:
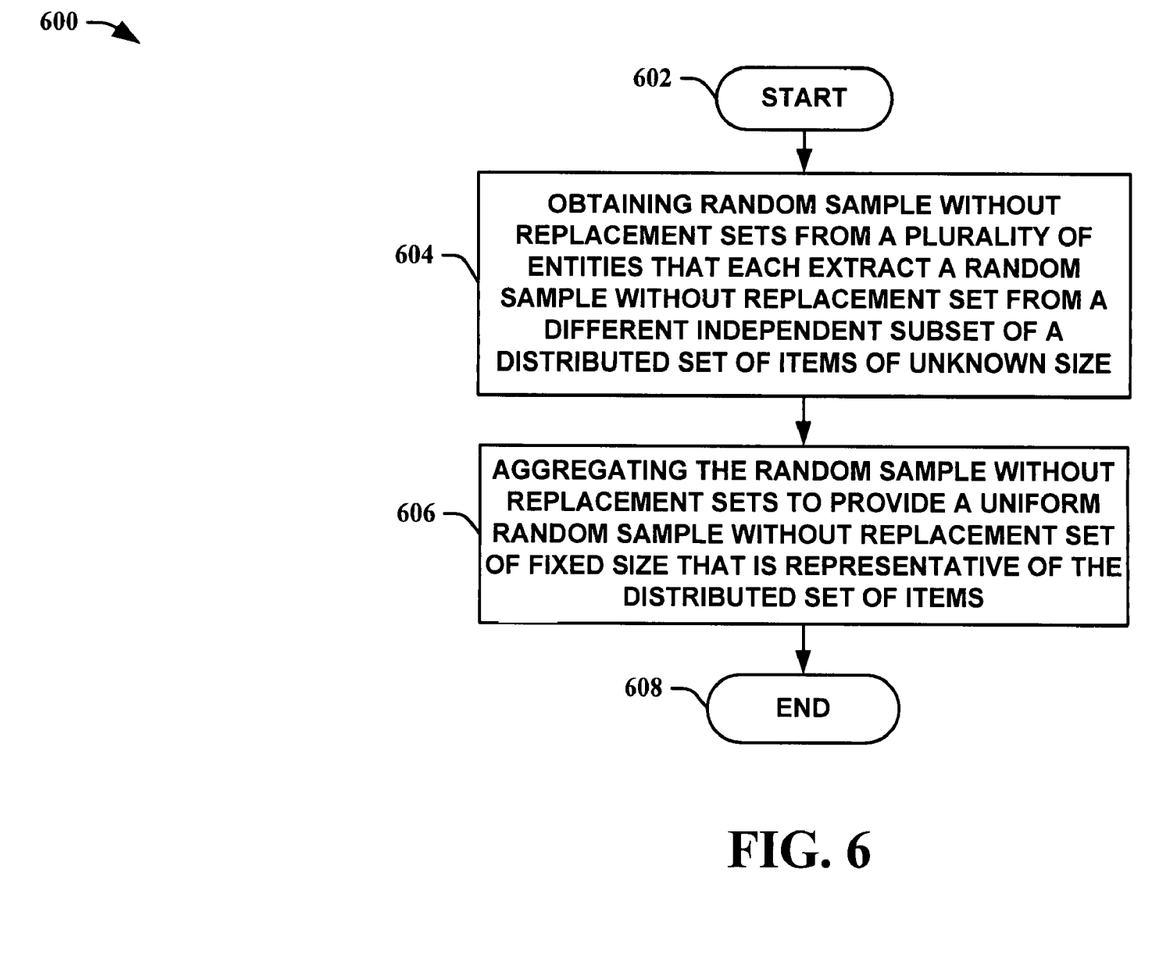
FIG. 6 is another flow diagram of a method of facilitating distributed set sampling in accordance with an aspect of an embodiment.
Figure 7:
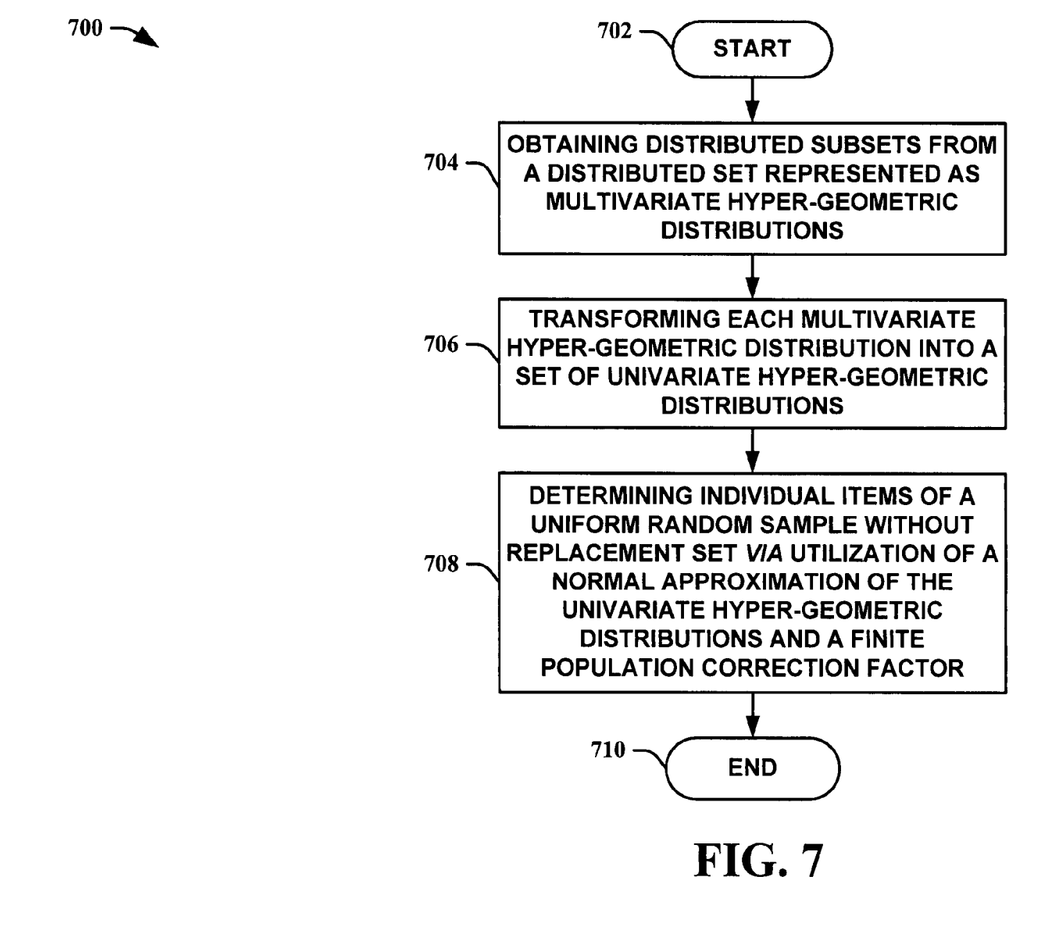
FIG. 7 is yet another flow diagram of a method of facilitating distributed set sampling in accordance with an aspect of an embodiment.

In view of the exemplary systems shown and described above, methodologies that may be implemented in accordance with the embodiments will be better appreciated with reference to the flow charts of FIGS. 5-7. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 5, a flow diagram of a method 500 of facilitating distributed set sampling in accordance with an aspect of an embodiment is shown. The method 500 starts 502 by obtaining random sample without replacement sets, each random sample without replacement set is extracted from a different independent subset of a distributed set of items of unknown size 504. The random sample sets can be obtained from a single entity and/or multiple entities and/or a combination thereof. The subsets can be obtained utilizing distributed reservoir sampling and the like detailed supra. The random sample without replacement sets are then aggregated to provide a uniform random sample without replacement set of fixed size that is representative of the distributed set of items 506, ending the flow 508. Typical aggregation techniques include, but are not limited to, distributed reservoir and the like.

Referring to FIG. 6, another flow diagram of a method 600 of facilitating distributed set sampling in accordance with an aspect of an embodiment is depicted. The method 600 starts 602 by obtaining random sample without replacement sets from a plurality of entities that each extract a random sample without replacement set from a different independent subset of a distributed set of items of unknown size 604. An entity can include, but is not limited to, a server, a car sensor, a robot sensor, a cellular phone, a personal digital assistant (PDA), a television reception and/or transmission device, a radio reception and/or transmission device, a mobile device, and/or a gaming device (e.g., online gaming device) and the like. An entity can utilize reservoir sampling to obtain the random samples. The random sample without replacement sets are then aggregated to provide a uniform random sample without replacement set of fixed size that is representative of the distributed set of items 606, ending the flow 608. For distributed subsets represented as multivariate hyper-geometric distributions, the aggregation can be achieved by randomly choosing a number of items $\{k_1, \ldots, k_s\}$ from each entity by sampling from the multivariate hyper-geometric distribution:

$$p(k_1, \ldots, k_s) = \frac{\prod_{i=1}^{s}\binom{N_i}{k_i}}{\binom{\sum_{i=1}^{s} N_i}{n^*}}; \quad \text{(Eq. 5)}$$

where s is a number of entities, n is a uniform sample size, i is an entity, $N_i$ is a number of items from the distributed set encountered by entity i, $n_i = \min(n, N_1)$ is a size of a random sample without replacement set of entity i, $n^* = \min(n, \Sigma_i N_i)$ is a size of the uniform random sample without replacement set, $k_i \leq n_i$, and $\Sigma_i k_i = n^*$; and then selecting $k_i$ items for each entity i by sampling uniformly without replacement from that entity's random sample without replacement set to construct the uniform random sample without replacement set.

Moving on to FIG. 7, yet another flow diagram of a method 700 of facilitating distributed set sampling in accordance with an aspect of an embodiment is illustrated. The method 700 starts 702 by obtaining distributed subsets from a distributed set represented as multivariate hyper-geometric distributions 704. Each multivariate hyper-geometric distribution is then transformed into a set of univariate hyper-geometric distributions 706. A multivariate hyper-geometric distribution can be transformed into a set of univariate hyper-geometric distributions wherein:

$$p(k_i | k_1, \ldots, k_{i-1}) = \frac{\binom{N_i}{k_i}\binom{N - N_i - \sum_{j=1}^{i-1} N_j}{n^* - k_i - \sum_{j=1}^{i-1} k_j}}{\binom{N - \sum_{j=1}^{i-1} N_j}{n^* - \sum_{j=1}^{i-1} k_j}}; \quad \text{(Eq. 12)}$$

where i is an entity, k is a random sample without replacement set item from an entity, $N_i$ is a number of items from the distributed set encountered by entity i, $n^* = \min(n, \Sigma_i N_i)$ is a size of the uniform random sample without replacement set, $n_i = \min(n, N_i)$ is a size of a random sample without replacement set of entity i, n is a uniform sample size, and $k_i$ is restricted to the values $$\left[0, n^* - \sum_{j=1}^{i-1} k_j\right].$$

Individual items of a uniform random sample without replacement set are then determined from $p(k_i | k_1, \ldots, k_{i-1})$ via utilization of a normal approximation of the univariate hyper-geometric distributions and a finite population correction factor 708, ending the flow 710.

Figure 8:
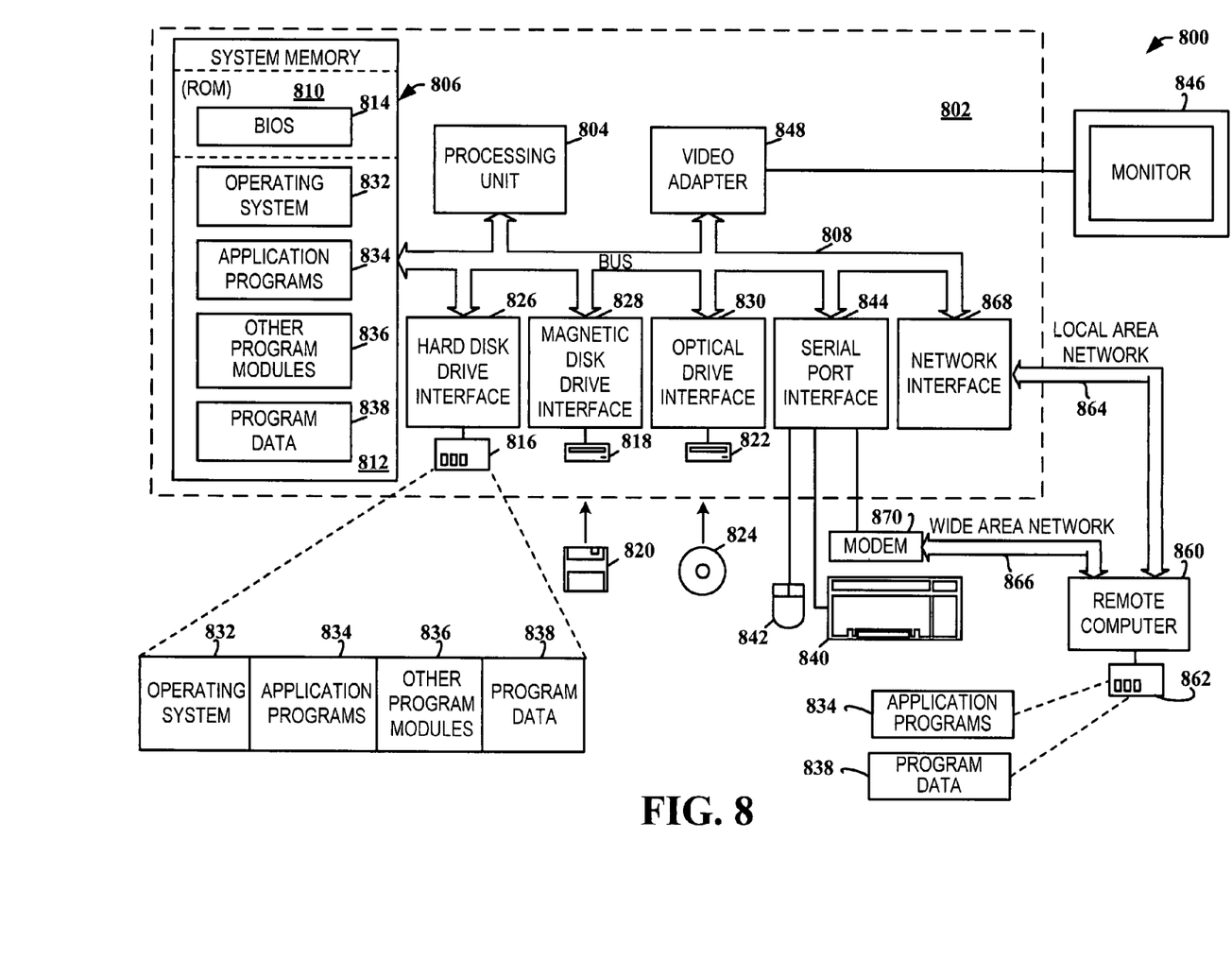
FIG. 8 illustrates an example operating environment in which an embodiment can function.

In order to provide additional context for implementing various aspects of the embodiments, FIG. 8 and the following discussion is intended to provide a brief, general description of a suitable computing environment 800 in which the various aspects of the embodiments may be implemented. While the embodiments have been described above in the general context of computer-executable instructions of a computer program that runs on a local computer and/or remote computer, those skilled in the art will recognize that the embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the embodiments may also be practiced in distributed computing environments where certain tasks are performed by remote processing devices that are linked through a communications network. However, some, if not all, aspects of the embodiments may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 8, an exemplary system environment 800 for implementing the various aspects of the embodiments include a conventional computer 802, including a processing unit 804, a system memory 806, and a system bus 808 that couples various system components, including the system memory, to the processing unit 804. The processing unit 804 may be any commercially available or proprietary processor. In addition, the processing unit may be implemented as multi-processor formed of more than one processor, such as may be connected in parallel.

The system bus 808 may be any of several types of bus structure including a memory bus or memory controller, a peripheral bus, and a local bus using any of a variety of conventional bus architectures such as PCI, VESA, Microchannel, ISA, and EISA, to name a few. The system memory 806 includes read only memory (ROM) 810 and random access memory (RAM) 812. A basic input/output system (BIOS) 814, containing the basic routines that help to transfer information between elements within the computer 802, such as during start-up, is stored in ROM 810.

The computer 802 also may include, for example, a hard disk drive 816, a magnetic disk drive 818, e.g., to read from or write to a removable disk 820, and an optical disk drive 822, e.g., for reading from or writing to a CD-ROM disk 824 or other optical media. The hard disk drive 816, magnetic disk drive 818, and optical disk drive 822 are connected to the system bus 808 by a hard disk drive interface 826, a magnetic disk drive interface 828, and an optical drive interface 830, respectively. The drives 816-822 and their associated computer-readable media provide nonvolatile storage of data, data structures, computer-executable instructions, etc. for the computer 802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 800, and further that any such media may contain computer-executable instructions for performing the methods of the embodiments.

A number of program modules may be stored in the drives 816-822 and RAM 812, including an operating system 832, one or more application programs 834, other program modules 836, and program data 838. The operating system 832 may be any suitable operating system or combination of operating systems. By way of example, the application programs 834 and program modules 836 can include a data mining scheme in accordance with an aspect of an embodiment.

A user can enter commands and information into the computer 802 through one or more user input devices, such as a keyboard 840 and a pointing device (e.g., a mouse 842). Other input devices (not shown) may include a microphone, a joystick, a game pad, a satellite dish, a wireless remote, a scanner, or the like. These and other input devices are often connected to the processing unit 804 through a serial port interface 844 that is coupled to the system bus 808, but may be connected by other interfaces, such as a parallel port, a game port or a universal serial bus (USB). A monitor 846 or other type of display device is also connected to the system bus 808 via an interface, such as a video adapter 848. In addition to the monitor 846, the computer 802 may include other peripheral output devices (not shown), such as speakers, printers, etc.

It is to be appreciated that the computer 802 can operate in a networked environment using logical connections to one or more remote computers 860. The remote computer 860 may be a workstation, a server computer, a router, a peer device or other common network node, and typically includes many or all of the elements described relative to the computer 802, although for purposes of brevity, only a memory storage device 862 is illustrated in FIG. 8. The logical connections depicted in FIG. 8 can include a local area network (LAN) 864 and a wide area network (WAN) 866. Such networking environments are commonplace in offices, enterprise-wide computer networks, intranets and the Internet.

When used in a LAN networking environment, for example, the computer 802 is connected to the local network 864 through a network interface or adapter 868. When used in a WAN networking environment, the computer 802 typically includes a modem (e.g., telephone, DSL, cable, etc.) 870, or is connected to a communications server on the LAN, or has other means for establishing communications over the WAN 866, such as the Internet. The modem 870, which can be internal or external relative to the computer 802, is connected to the system bus 808 via the serial port interface 844. In a networked environment, program modules (including application programs 834) and/or program data 838 can be stored in the remote memory storage device 862. It will be appreciated that the network connections shown are exemplary and other means (e.g., wired or wireless) of establishing a communications link between the computers 802 and 860 can be used when carrying out an aspect of an embodiment.

In accordance with the practices of persons skilled in the art of computer programming, the embodiments have been described with reference to acts and symbolic representations of operations that are performed by a computer, such as the computer 802 or remote computer 860, unless otherwise indicated. Such acts and operations are sometimes referred to as being computer-executed. It will be appreciated that the acts and symbolically represented operations include the manipulation by the processing unit 804 of electrical signals representing data bits which causes a resulting transformation or reduction of the electrical signal representation, and the maintenance of data bits at memory locations in the memory system (including the system memory 806, hard drive 816, floppy disks 820, CD-ROM 824, and remote memory 862) to thereby reconfigure or otherwise alter the computer system's operation, as well as other processing of signals. The memory locations where such data bits are maintained are physical locations that have particular electrical, magnetic, or optical properties corresponding to the data bits.

Figure 9:
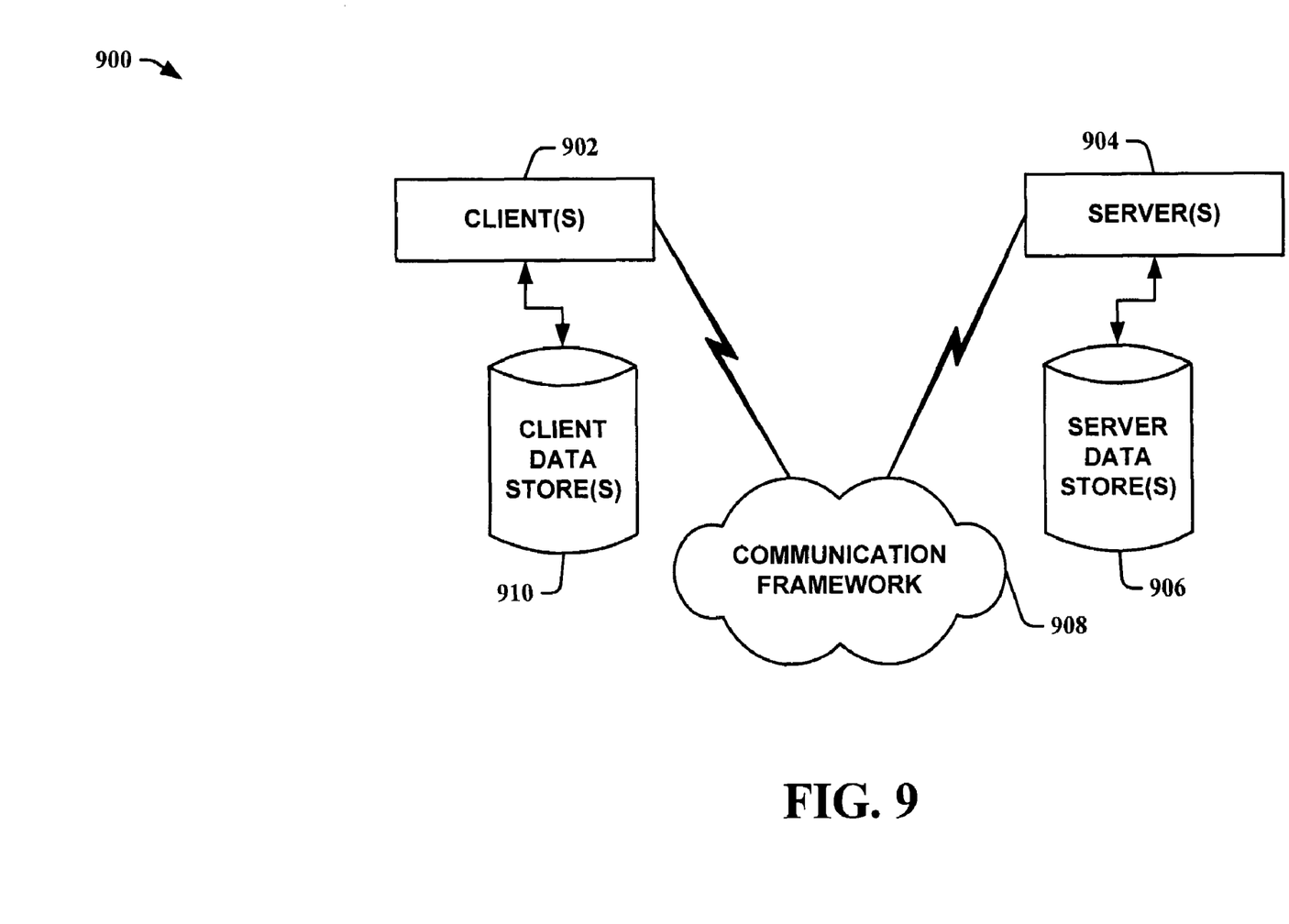
FIG. 9 illustrates another example operating environment in which an embodiment can function.

FIG. 9 is another block diagram of a sample computing environment 900 with which embodiments can interact. The system 900 further illustrates a system that includes one or more client(s) 902. The client(s) 902 can be hardware and/or software (e.g., threads, processes, computing devices). The system 900 also includes one or more server(s) 904. The server(s) 904 can also be hardware and/or software (e.g., threads, processes, computing devices). One possible communication between a client 902 and a server 904 may be in the form of a data packet adapted to be transmitted between two or more computer processes. The system 900 includes a communication framework 908 that can be employed to facilitate communications between the client(s) 902 and the server(s) 904. The client(s) 902 are connected to one or more client data store(s) 910 that can be employed to store information local to the client(s) 902. Similarly, the server(s) 904 are connected to one or more server data store(s) 906 that can be employed to store information local to the server(s) 904.

It is to be appreciated that the systems and/or methods of the embodiments can be utilized in data mining facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data mining, comprising:
a receiving component that obtains random sample without replacement sets, each random sample without replacement set is extracted from a different independent subset of a distributed set of items of unknown size; and
an aggregating component that aggregates the random sample without replacement sets to provide a uniform random sample without replacement set of fixed size that is representative of the distributed set of items.

2. The system of claim 1, the receiving component obtains the random sample without replacement sets from a plurality of entities, each entity extracts a random sample without replacement set from a different independent subset of the distributed set of items.

3. The system of claim 2, the entities comprising Internet web servers.

4. The system of claim 3, the entities obtain random sample without replacement sets that relate to Internet web traffic information.

5. The system of claim 2, the entities comprising at least one robot sensor and/or at least one car sensor.

6. A system that employs the system of claim 1 to facilitate in determining Internet web traffic for at least one Internet web site.

7. The system of claim 1 employs a distributed reservoir sampling technique to facilitate in determining the uniform random sample without replacement set.

8. The system of claim 1, the distributed set of items comprising data relating to an Internet web site.

9. The system of claim 1 employs at least one multivariate hyper-geometric distribution to facilitate in determining the uniform random sample without replacement set.

10. The system of claim 9 transforms at least one multivariate hyper-geometric distribution into a set of univariate hyper-geometric distributions and utilizes a normal approximation to determine what fraction of a random sample without replacement set is employed in an aggregate sample.

11. The system of claim 1, at least one of the entities is physically remote from at least one other entity.

12. A data mining system that employs the system of claim 1 to mine data relating to cellular phone usage, online gaming usage, television usage, email usage, and/or voice over Internet Protocol (VOIP) usage.

13. A method for facilitating data mining, comprising:
randomly sampling without replacement an independent subset of a distributed set of items of unknown size to obtain a random sample without replacement set for each independent subset; and
aggregating the random sample without replacement sets to provide a uniform random sample without replacement set of fixed size that is representative of the distributed set of items.

14. The method of claim 13, the subset sampling performed by a plurality of entities that each independently extract a random sample without replacement set from different subsets.

15. The method of claim 14, the entities comprising servers that support an Internet web site.

16. The method of claim 13, the distributed set of items comprising data relating to an Internet web site.

17. The method of claim 13 further comprising:
employing at least one multivariate hyper-geometric distribution to facilitate in determining the uniform random sample without replacement set.

18. The method of claim 17 further comprising:
randomly choosing a number of items $\{k_1, \ldots, k_s\}$ from each entity by sampling from the multivariate hyper-geometric distribution utilizing:

$$p(k_1, \ldots, k_s) = \frac{\prod_{i=1}^{s} \binom{N_i}{k_i}}{\binom{\sum_{i=1}^{s} N_i}{n^*}} \quad \text{(Eq. 5)}$$

where s is a number of entities, n is a uniform sample size, i is an entity, $N_i$ is a number of items from the distributed set encountered by entity i, $n_i = \min(n, N_i)$ is a size of a random sample without replacement set of entity i, $n^* = \min(n, \Sigma_i N_i)$ is a size of the uniform random sample without replacement set, $k_i \leq n_i$, and $\Sigma_i k_i = n^*$; and
selecting $k_i$ items for each entity i by sampling uniformly without replacement from that entity's random sample without replacement set to construct the uniform random sample without replacement set.

19. The method of claim 17 further comprising:

transforming at least one multivariate hyper-geometric distribution into a set of univariate hyper-geometric distributions utilizing:

$$p(k_i | k_1, \ldots, k_{i-1}) = \frac{\binom{N_i}{k_i} \binom{N - N_i - \sum_{j=1}^{i-1} N_j}{n^* - k_i - \sum_{j=1}^{i-1} k_j}}{\binom{N - \sum_{j=1}^{i-1} N_j}{n^* - \sum_{j=1}^{i-1} k_j}}, \quad \text{(Eq. 12)}$$

where i is an entity, k is a random sample without replacement set item from an entity, $N_i$ is a number of items from the distributed set encountered by entity i, $n^* = \min(n, \Sigma_i N_i)$ is a size of the uniform random sample without replacement set, $n_i = \min(n, N_i)$ is a size of a random sample without replacement set of entity i, n is a uniform sample size, and $k_i$ is restricted to the values $$\left[ 0, n^* - \sum_{j=1}^{i-1} k_j \right];$$

and determining at least one individual item of the uniform random sample without replacement set from $p(k_i | k_1, \ldots, k_{i-1})$ utilizing a normal approximation of the univariate hyper-geometric distributions and a finite population correction factor.

20. A system that facilitates data mining, comprising:

means for obtaining a plurality of random sample without replacement sets, each random sample without replacement set is extracted from a different independent subset of a distributed set of items of unknown size; and means for aggregating the random sample without replacement sets to provide a uniform random sample without replacement set of fixed size that is representative of the distributed set of items.

* * * * *